US011144420B2

(12) United States Patent
Ganu et al.

(10) Patent No.: US 11,144,420 B2
(45) Date of Patent: Oct. 12, 2021

(54) DYNAMIC RESOURCE ALLOCATION IN A WIRELESS ACCESS POINT TO SUPPORT EVENT CAPTURE

(71) Applicant: Hewlett Packard Enterprise Development LP, Houston, TX (US)

(72) Inventors: Sachin Ganu, Santa Clara, CA (US); Karthik Murthy, Santa Clara, CA (US); Ahmad Kholaif, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 73 days.

(21) Appl. No.: 16/557,484

(22) Filed: Aug. 30, 2019

(65) Prior Publication Data

US 2021/0064494 A1 Mar. 4, 2021

(51) Int. Cl.
*G06F 11/30* (2006.01)

(52) U.S. Cl.
CPC ...... *G06F 11/3013* (2013.01); *G06F 11/3031* (2013.01); *G06F 11/3093* (2013.01)

(58) Field of Classification Search
CPC ............. G06F 11/3013; G06F 11/3031; G06F 11/3093; G06F 11/079; G06F 11/0751; H04W 8/245
See application file for complete search history.

(56) References Cited

U.S. PATENT DOCUMENTS 6,385,673 B1 * 5/2002 DeMoney .......... H04N 21/2312 348/E5.008
7,548,539 B2 6/2009 Kouretas et al.
8,665,892 B2 3/2014 Lund
2007/0087763 A1 * 4/2007 Budampati ........... H04W 12/06 455/456.5
2007/0276933 A1 11/2007 Lee et al.
2008/0247409 A1 * 10/2008 Choudhury ............. H04L 49/90 370/412
2010/0315960 A1 12/2010 Li
2013/0145461 A1 * 6/2013 Barton .................. H04W 40/32 726/22

(Continued)

OTHER PUBLICATIONS

Ahmed, A. U. et al., Dynamic Resource Allocation in Hybrid Access Femtocell Network, (Research Paper), The Scientific World Journal, Mar. 20, 2014, pp. 1-7, vol. 2014.

*Primary Examiner* — Farley Abad

(74) *Attorney, Agent, or Firm* — Jaffery Watson Mendonsa & Hamilton

(57) ABSTRACT

Architectures and techniques to manage resources in a wireless access point. A first set of weights is associated with connected wireless client devices. The first set of weights includes at least one weight for each of the connected wireless client devices. Space is allocated within the packet monitoring buffer to capture packet information for the connected wireless devices using the first set of weights. An indication of an event of interest is received. A second set of weights is associated with the connected wireless client devices. The second set of weights includes at least one weight for each of the connected wireless client devices in response to the indication of the event. Space is allocated within the packet monitoring buffer to capture packet information for the connected wireless devices using the second set of weights.

20 Claims, 5 Drawing Sheets

(56) References Cited

U.S. PATENT DOCUMENTS

| | | | | |
|---|---|---|---|---|
| 2016/0105462 | A1* | 4/2016 | Duffield | G06F 21/552 726/1 |
| 2017/0244651 | A1 | 8/2017 | Saxton | |
| 2019/0129693 | A1* | 5/2019 | Patel | G06F 16/9017 |
| 2019/0132249 | A1* | 5/2019 | Smith | G06F 13/36 |

* cited by examiner

External Network
110
Access Point
120
Client Device
130
Client Device
140
...
Client Device
170

DYNAMIC RESOURCE ALLOCATION IN A WIRELESS ACCESS POINT TO SUPPORT EVENT CAPTURE

TECHNICAL FIELD

Embodiments relate to techniques and architectures for managing resources within a wireless access point. More particularly, embodiments relate to techniques and architectures for more efficiently managing memory resources that can be utilized for anomaly detection and management.

BACKGROUND

An access point provides client devices with access to a communication network for transmitting and receiving packets to and from other devices. Problems in connectivity between the client devices and the access point, referred to as "anomalies," sometimes occur. To mitigate interruptions in access to the communication network, actions are taken to address these anomalies. However, these actions and related support for these actions can be resource intensive within the access point.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
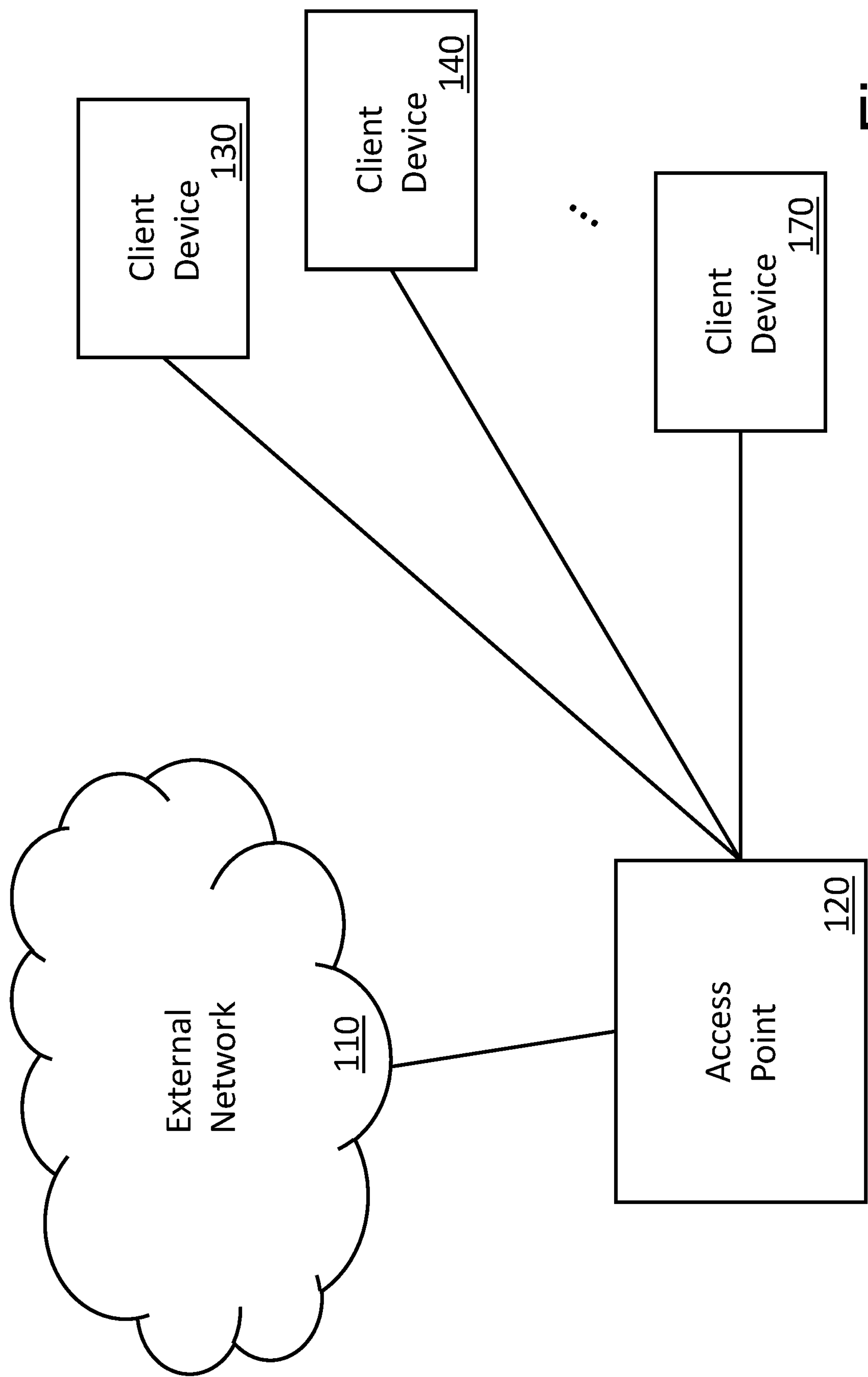
FIG. 1 is a block diagram of one embodiment of a wireless network having an access point and multiple client devices.

In the following description, numerous specific details are set forth. However, embodiments of the invention may be practiced without these specific details. In other instances, well-known structures and techniques have not been shown in detail in order not to obscure the understanding of this description.

From time to time, anomalies occur in connectivity between the client devices and an access point. Analyzing and finding root causes for anomalies in connectivity related to the transmission or reception of packets can be challenging due to sporadic occurrences and lack of timely information capture. Typically, this process relies on recreating the anomaly and collecting packet traces manually. Experts interpret the raw packet captures to identify the root cause of an anomaly and initiate corrective actions. This approach is tedious, reactive, and incurs a delay in a timely response to mitigate the anomaly. Moreover, client devices are vulnerable to several low-level issues in interoperability between the client devices and the access point that can only be detected and identified by the access point.

In accordance with illustrative examples of the present disclosure, anomalies in connectivity between a client device and an access point are proactively detected by an access point as the anomalies occur. Anomalies in packet traffic and anomalies in connectivity due to radio frequency interference are both detected by the access point.

According to illustrative examples of the present disclosure, an access point providing a client device with access to a communication network detects an anomaly in packet traffic. In response to detecting the anomaly, the access point performs a packet capture of packets being transmitted to or received from the client device. The access point determines an anomaly type representing a root cause of the anomaly and annotates the packet capture with the anomaly type. The access point also detects radio frequency interference exceeding a prescribed threshold and, in response, performs a spectrum capture. The packet capture annotated with the anomaly type and/or the spectrum capture are reported automatically or upon request.

Described herein are embodiments of techniques and architectures to manage finite resources (e.g., wireless access point memory, processing bandwidth) within an electronic device to accomplish packet capture functionality. While most of the examples provided herein are presented in terms of anomaly detection and response in a wireless access point by managing one or more buffers to be used for information capture within the wireless access point, the concepts described herein are more broadly applicable.

In some embodiments, heuristic-based indicators can be utilized to predict the occurrence of connectivity anomalies. The predicted anomalies can be ranked in order of severity and buffer allocations can be adapted to store information about the predicted anomalies. This can be useful, for example, in situations where there are a large number of connected devices and clients, and allocating reserved buffers per client for information capture is either too resource-expensive, or provides insufficient support for the desired functionality.

As described in greater detail below, using the approaches described herein buffer allocations within a wireless access point can be managed to capture event (e.g., packet capture corresponding to an anomaly) details without loss of information. Information capture can include, for example, packet capture or spectral FFT (Fast Fourier Transform) captures. In some embodiments, the captured information can be reported to an external analytics engine for further analysis (e.g., more accurate root cause analysis) and/or faster convergence across a broader network. In some embodiments, information from the analytics engine can be utilized to more accurately predict anomalies that can be considered for capture.

In a dense network scenario, many wireless client devices may be associated with a wireless access point (AP). Managing allocation of available memory buffers to collect optimal packet histories for each wireless client device can be difficult (or even impossible) in terms of memory requirements and/or processor cycles utilized. For example, fixed buffer pre-allocations per client can result in insufficient data being collected for accurate analysis of connectivity anomalies. Also, fixed buffer allocations result in unused buffers when the wireless access point is associated with a small number of connected wireless client devices. This strategy also limits flexibility, for example, not supporting the ability to capture packets for a specific type of wireless client device (e.g., roaming wireless client devices).

FIG. 1 is a block diagram of one embodiment of a wireless network having an access point and multiple client devices.

The example network of FIG. 1 is a simple example and much more complicated real-world networks can be supported.

Access point 120 provides access to external network 110 for any number of client devices (e.g., 130, 140, 170). The client devices can be any type of wireless-enabled electronic devices, for example, desktop computers, laptop computers, tablets, smartphones, wearable devices, environmental sensors/controllers, etc. In general, access point 120 is a hardware networking device that allows one or more client devices to access larger networks (e.g., external network 110) using one or more radio frequency links. Access point 120 can support, for example, some or all of the IEEE 802.11 family of standards and other suitable standards. Access point 120 can be a standalone device connected to a gateway, router or other intermediate device (not illustrated in FIG. 1). External network 110 can be any type of network, for example, the Internet.

Figure 2:
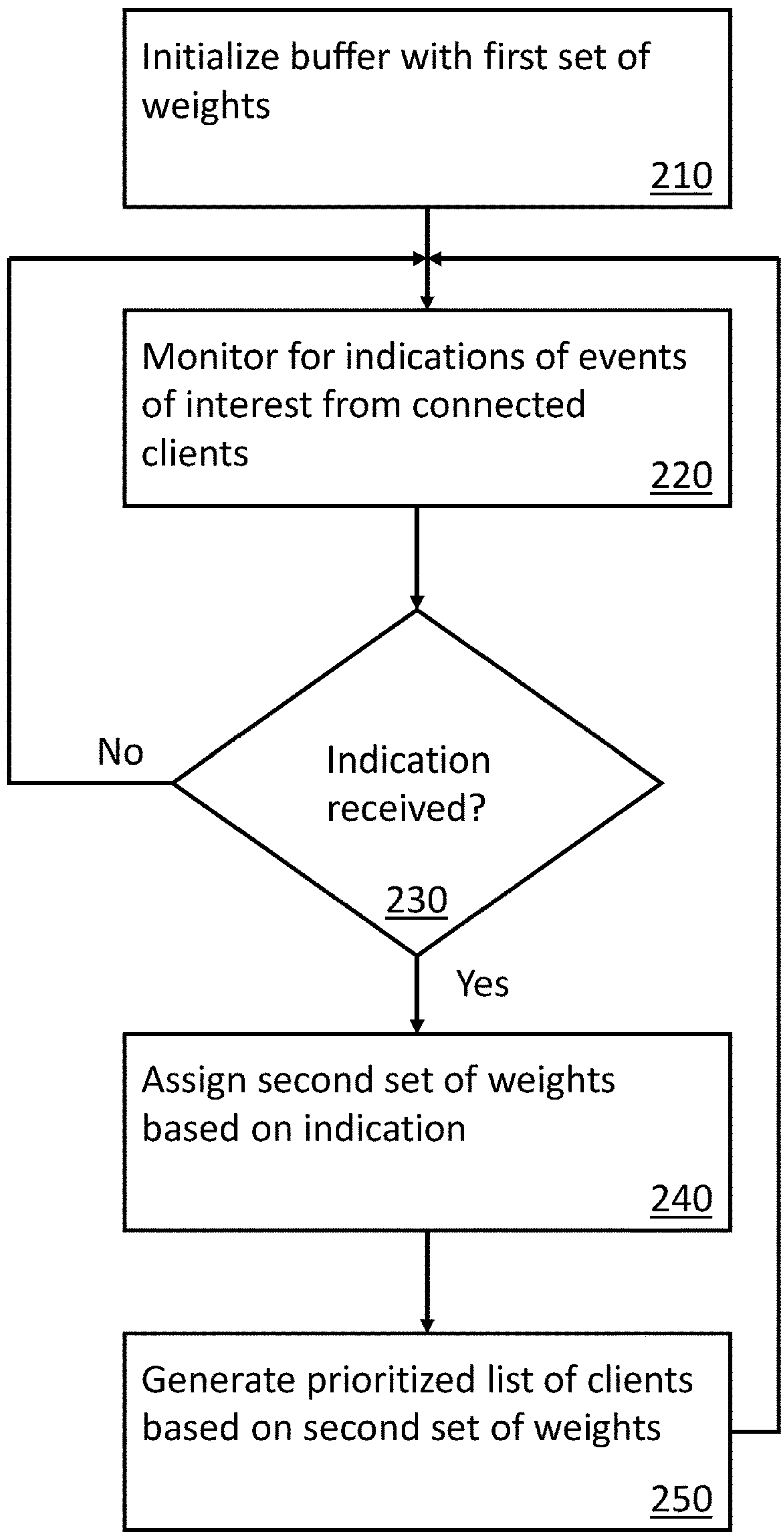
FIG. 2 is a flow diagram of one embodiment of a technique to manage a buffer pool in an access point.

FIG. 2 is a flow diagram of one embodiment of a technique to manage a buffer pool in an access point. In various embodiments, a prediction method can be utilized to observe packet patterns and to give early indications to the packet capture mechanisms within the access point to all for resizing of packet capture buffers on a per-client basis. The indications can be utilized in association with dynamic buffer management in response to a sorted prioritized list of clients whose packets are to be monitored and/or captured.

The buffer can be initialized to a first set of weights, 210. That is, in the beginning, when there are no clients, the buffer pool is empty and all weights can be initialized to zero. In alternate embodiments, different weights can be used for the first set of weights.

The access point monitors for indications of events of interest from one or more client devices, 220. The indication can be, for example, specific activity by a client device (e.g., new connection), characteristics of a client device (e.g., roaming, battery power), an indication from a third device, etc. If no indication is received, 230, the access point continues to operate using the current weights and monitors for indications of an event of interest.

If an indication is received, 230, the access point can generate a second set of weights, 240. For example, for every new client connection attempt starting with the IEEE 802.11 Auth request (which indicates a client's attempt to connect to the access point radio), the new client can be added to the current client list with a weight of W(Auth). This causes the packets related to new client onboarding to the access point are captured in the buffer.

During this authentication process there may be other client devices associated with the access point that may be exchanging data within desired performance parameters (e.g., good client health, good signal-to-noise ratio (SNR), high modulation and coding scheme (MCS) for upstream and downstream, low packet loss). These client devices can be assigned low weights in the second set of weights (240).

In some embodiments, for clients that are within the access point coverage area trailing SNR signal levels can be checked and the corresponding weights can be increased. This can cover client devices that remain connected to the access point at low signal levels causing poor performance for one or more clients connected to the access point.

In some embodiments, if a client begins to encounter packet retries, the weights for that client can be increases. This can help collect packets during problematic situations to assist in determining the root cause of the retries (e.g., whether a client-side or an AP-side problem). While a few examples have been provided herein, many additional reasons and/or conditions can be indications of events of interest resulting in corresponding weight changes for one or more client devices.

In some embodiments, different indicators can have different levels of importance with respect to other indicators and the corresponding likelihood of an anomaly. The weights assigned to clients can be proportional with this level of importance. For example, one of three weights can be assigned to client devices based on corresponding indicators. As another example, six weights can be assigned to client devices based on the indicators. Any number of weights and any number of indicators can be supported.

The weights can be utilized to generate a prioritized list of client devices, 250. The process of FIG. 2 can be repeated continually during operation of the access point to provide dynamic weighting adjustments that can be utilized for dynamic buffer management (described in greater detail below) to support frame capture corresponding to anomalies.

Figure 3:
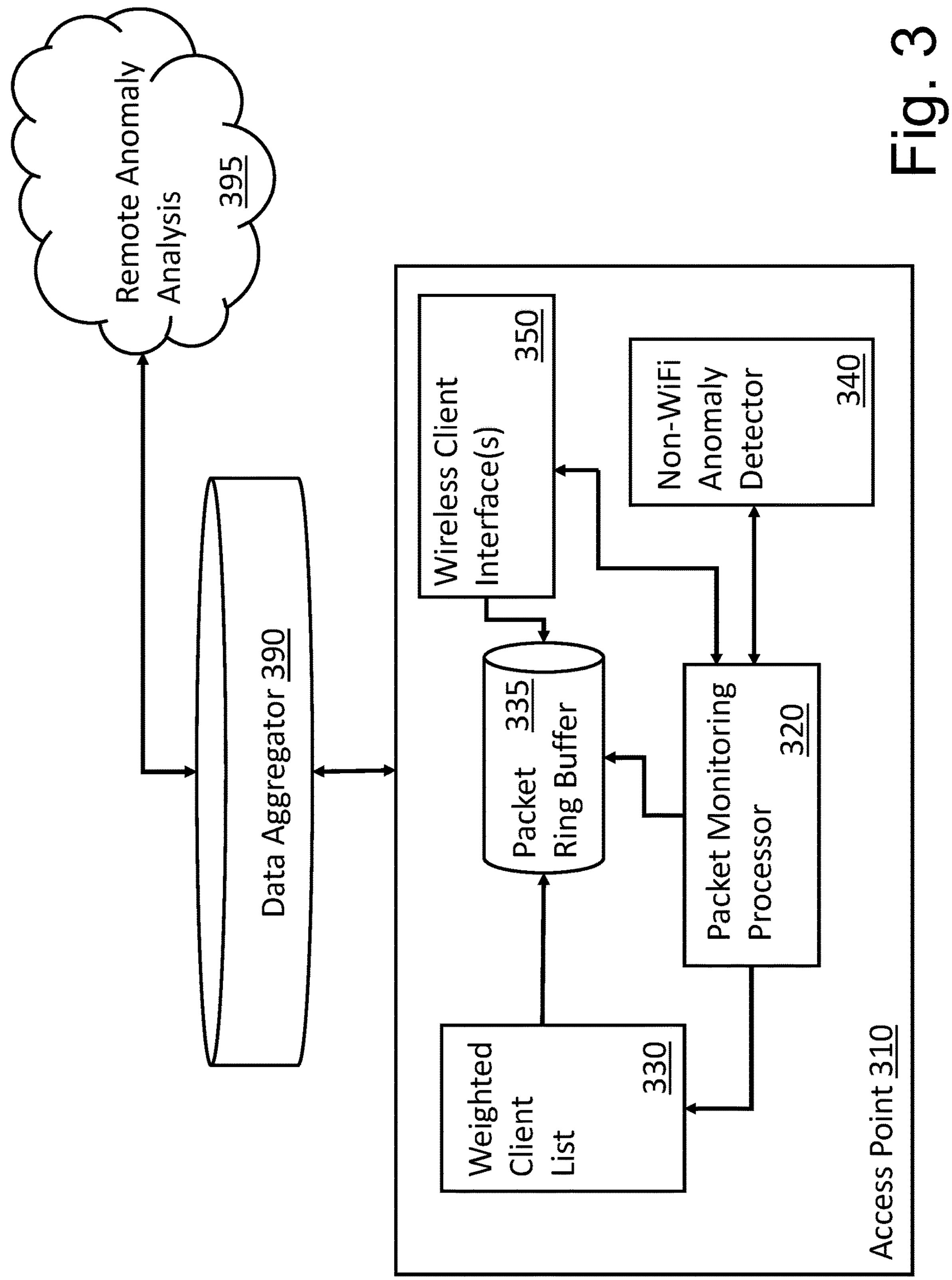
FIG. 3 is a block diagram of one embodiment of a wireless access point configurable to perform the functions described herein.

FIG. 3 is a block diagram of one embodiment of a wireless access point configurable to perform the functions described herein. Access point 310 can be any type of wireless access point capable of performing the functions (e.g., the process of FIG. 2) described herein. Additional functional components are not illustrated in FIG. 3 for reasons of simplicity of description.

Access point 310 can be part of a larger network (e.g., access point 120 of FIG. 1), which is not illustrated in FIG. 3. Access point 310 includes wireless radio interface(s) 350, which can function to provide wireless connectivity between one or more remote client devices (not illustrated) and access point 310. Wireless client interface(s) 350 can be compliant with, for example, the IEEE 802.11 family of standards. Additional and/or different wireless standards can also be supported.

Packet monitoring processor 320 can be coupled with wireless client interface(s) 350 to monitor incoming traffic, receive indications of anomalies and/or provide other monitoring functionality. Packet monitoring processor 320 functions to generate weighted client list 330, as discussed above. In various embodiments, weighted client list 330 includes a list of all wireless client devices associated with access point 310 through wireless client interface(s) 350. In some embodiments, weighted client list 330 can be updated dynamically by packet monitoring processor 320 (e.g., as described with respect to FIG. 2).

In some embodiments, access point 310 can function to capture additional, non-packet information, for example, FFT capture or other RF environment information. This can be in response to signals received from non-WiFi anomaly detector 340. Information from non-WiFi anomaly detector 340 can also be utilized to updated weighted client list 330. In various embodiments, packet ring buffer 335 can allocate space for capture functionality based on weighted client list 330 under control of packet monitoring processor 320.

In some embodiments, packet (or FFT) ring buffer 335 is a common ring buffer that is shared by all connected clients. In various embodiments, the clients have their own private rings, with buffers that map uniquely to buffers on the shared ring. So, when a read/write is performed to a private ring, that read/write is translated to a corresponding operation on the common ring buffer. A reverse mapping between the shared ring buffer and the client ring buffers is also provided.

Figure 4:
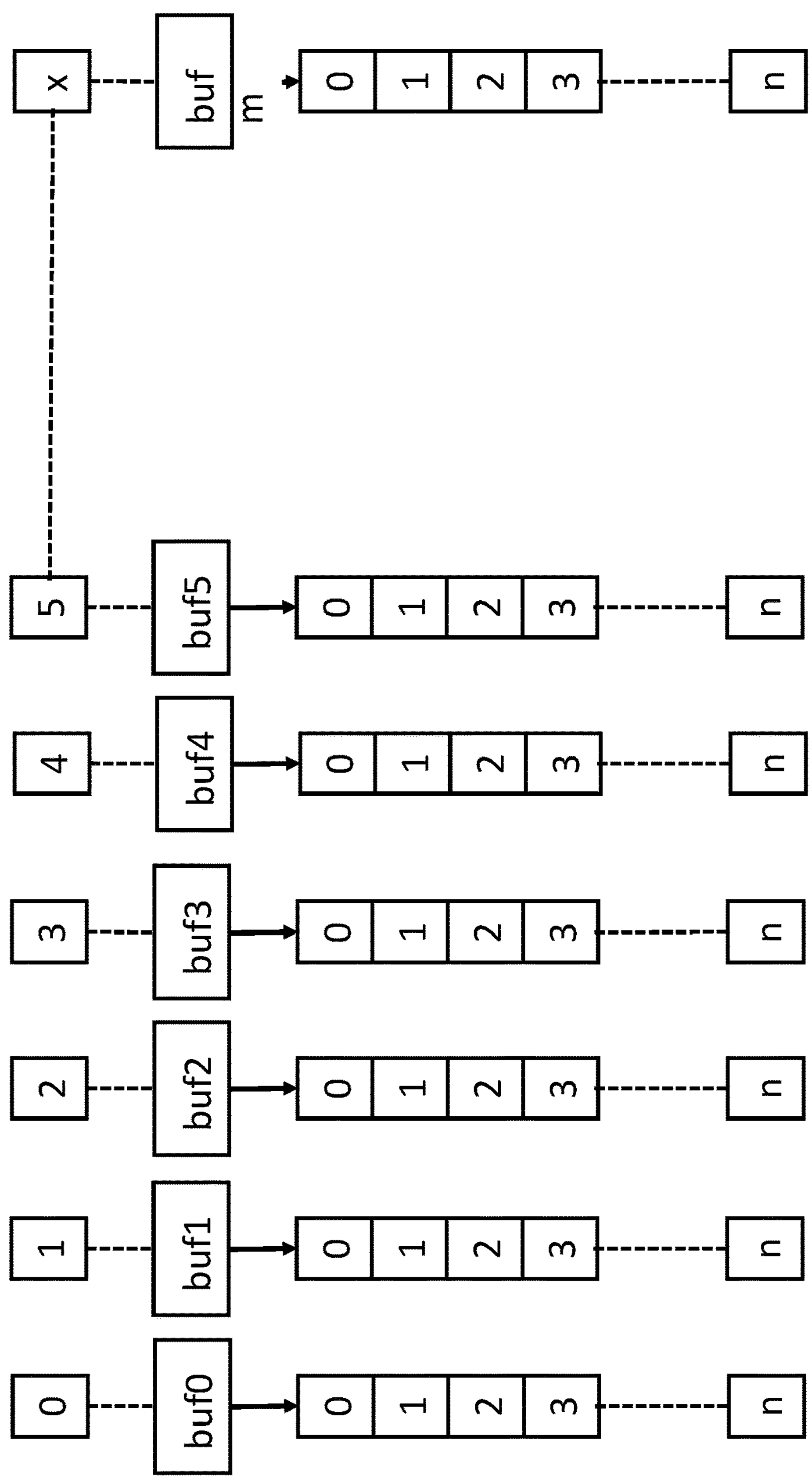
FIG. 4 is a conceptual diagram of buffer slots that can be managed as described herein.

FIG. 4 is a conceptual diagram of buffer slots that can be managed as described herein. In the example of FIG. 4, a bitmap of buffer slots $m=(x \text{ slots/client*max clients})$ such that 0<x≤m, where the total number of buffers in the ring N=n*m.

In some embodiments, a bitmap of client ring slots can be maintained, sized such that the total number of client buffers equals the buffers in the shared ring buffer (e.g., 335 in FIG. 3). When a client wireless device has a new packet to write, it can either map the client ring from the first available slot in the bitmap or wrap around the currently mapped client ring buffers. The client ring can get unmapped from the client and released back to the buffer slot in the bitmap.

In some embodiments, a hash bucket is maintained to access client rings. For example, for a new client connection, a new element is added to the hash bucket's list upon receiving the IEEE 802.11 Auth request. Based on the weight associated with the client, the client gets a credit of proportional number of buffer slots that it is allowed to map. If the credit per weight has been exhausted, then the buffer slots from lower priority clients are relinquished in order to satisfy the credits for the new client. In some embodiments, when the access point sends the IEEE 802.11 Deauth message or when the client sends the IEEE 802.11 Disassoc message, it is deleted from the hash list.

In some embodiments, new client rings can be mapped for a client device as long as there are additional buffer slots available for the client device. When packets from a client device overwrite the shared ring buffer that is mapped to one of the client's buffers in the client ring before wrapping, the client ring can be unmapped and released back to the buffer slot in the bitmap.

In various embodiments, an ordered list of clients is maintained in terms of weights and based on heuristics or client activity such that each client in the hash table has a weight associated with it that translates into the number of client ring buffers that can be mapped for the client device. For example, after a client authenticates with the access point, receives an IP address and starts exchanging data, the priority for that client device can be dropped corresponding to a lower weight. In the process of ordering, if a client device has more ring buffers than it is allowed, the extra buffers can be released back to the buffer slots in the bitmap so new client rings can be mapped from the buffer slot.

In some embodiments, when client packet data is to be written to the ring buffer, it either wraps around or maps to a new client ring from the buffer slot in the bitmap. When it is time to write at the write index of the client ring, exclusive access is granted to write to the index of the shared ring. The previously mapped shared ring buffer is then released and the current write index of the shared ring buffer is mapped to the write index of the client ring buffer. In some embodiments, if the shared ring buffer at the write index is currently mapped to a different client, the shared ring buffer is unmapped from that client before re-mapping to the current client.

In some embodiments, when a trigger is set for a particular client, the client ring buffer operates in read-write mode and it starts reading from its mapped shared ring buffers. Ring empty and ring full conditions are handled for the client ring buffer. Also, if a write is attempted on the shared ring buffer in read mode by another client, it will have to wait/skip until it is read by the client that owns the mapping and its subsequent release.

Figure 5:
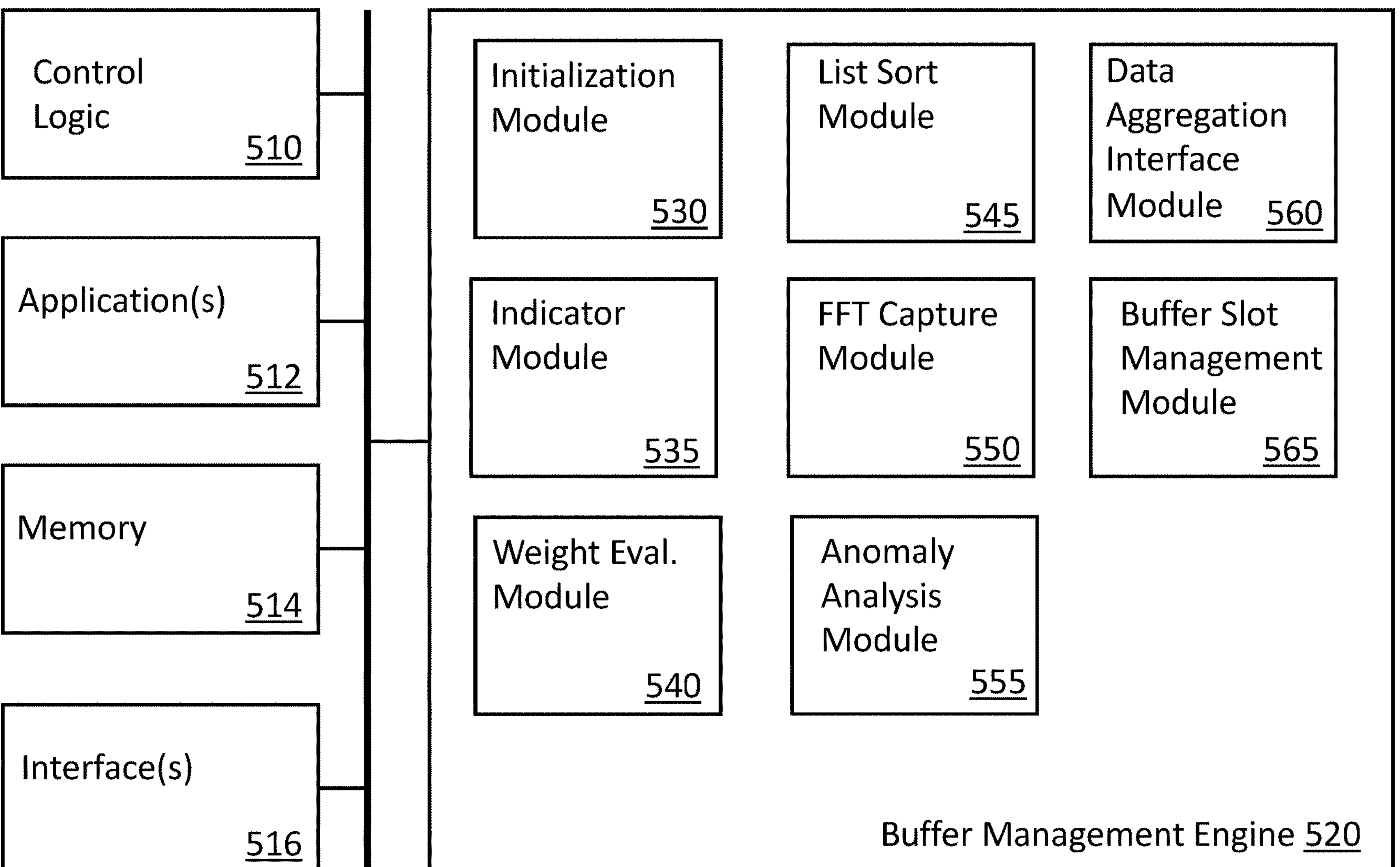
FIG. 5 is a block diagram of a buffer management system that can provide buffer management functionality as described herein.

FIG. 5 is a block diagram of a buffer management system that can provide buffer management functionality as described herein. In one embodiment, one or more token management and validation agents may exist and/or operate within the host environment. The agent of FIG. 5 may provide functionality as described, for example, with respect to FIGS. 1-4. The agent of FIG. 5 may also provide additional functionality.

In one embodiment, token management and buffer management agent 500 includes control logic 510, which implements logical functional control to direct operation of token management and buffer management agent 500, and/or hardware associated with directing operation of token management and buffer management agent 500. Logic may be hardware logic circuits and/or software routines. In one embodiment, token management and buffer management agent 500 includes one or more applications 512, which represent a code sequence and/or programs that provide instructions to control logic 510.

Buffer management agent 500 includes memory 514, which represents a memory device and/or access to a memory resource for storing data and/or instructions. Memory 514 may include memory local to token management and buffer management agent 500, as well as, or alternatively, including memory of the host system on which token management and buffer management agent 500 resides. Token management and buffer management agent 500 also includes one or more interfaces 516, which represent access interfaces to/from (an input/output interface) token management and buffer management agent 500 with regard to entities (electronic or human) external to token management and buffer management agent 500.

Token management and buffer management agent 500 also includes token management and buffer management engine 520, which represents one or more functions or module that enable token management and buffer management agent 500 to provide the index backups as described above. The example of FIG. 5 provides several modules that may be included in token management and buffer management engine 520; however, different and/or additional modules may also be included. Example modules that may be involved in providing buffer management functionality described herein include, for example, initialization module 530, indicator module 535, weight evaluation module 540, list sort module 545, FFT capture module 550, anomaly analysis module 555, data aggregation interface module 560 and bitmap management module 565. As used herein, a module refers to routine, a subsystem, logic circuit, microcode, etc., whether implemented in hardware, software, firmware or some combination thereof.

In various embodiments, initialization module 530 functions to provide initial weightings for connected client devices. This can occur, for example, upon initial start up of the host access point. In various embodiments, initialization module 530 can communicate the initial weights to other system components. In various embodiments, indicator module 535 functions to receive and/or detect indications of events of interest. As discussed above, these indications can be utilized to re-evaluate client weighting and cause reorganization of the prioritized client list.

In various embodiments, weight evaluation module 540 functions to provide revised weightings for connected client devices. This can occur, for example, upon detection of an event of anomaly. In various embodiments, initialization module 540 can communicate the initial weights to other system components. In various embodiments, list sort module 545 functions to receive revised weights for the connected clients and generate a prioritized listing of clients based on the revised weights. As discussed above, the prioritized can be utilized to allocate buffer space in a shared ring buffer that can be utilized for packet capture functionality.

In various embodiments, FFT capture module 550 functions to capture radio signal information related to wireless communications associated with anomalies. This information can be used along with packet capture information to provide additional anomaly analysis. In various embodiments, anomaly analysis module 555 functions to provide some analysis about a cause of, or condition associated with, a detected anomaly. As discussed above, this can be, for example, client device condition (e.g., roaming), client device status (e.g., authenticating), etc. Data aggregation interface module 560 can provide an interface to send and receive packet (and possibly FFT) information to and from a remote aggregator that can provide additional anomaly analysis. Buffer slot management module 565 operates to manage the mapping functionality described above. In some embodiments, buffer slot management module 565 can function to attach buffer slots to client rings. In some embodiments, buffer slot management module 565 can function to map/unmap client buffers in the ring to the shared ring buffers. In some embodiments, buffer slot management module 565 can function to relinquish buffers back to the buffer slots.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A wireless network access point comprising:
- a first wireless interface to receive network traffic from wireless client devices;
- a packet monitoring buffer to store packet information received from wireless client devices connected via the first wireless interface, the packet monitoring buffer having a portion for each of the connected wireless client devices;
- a packet monitoring processor coupled with the packet monitoring buffer, the packet monitoring processor to:
  - associate a first set of weights with the connected wireless client devices, wherein the first set of weights comprises at least one weight for each of the connected wireless client devices,
  - allocate space within the packet monitoring buffer to capture packet information for the connected wireless devices using the first set of weights,
  - receive an indication of an anomalous event of interest,
  - associate a second set of weights with the connected wireless client devices, wherein the second set of weights comprises at least one weight for each of the connected wireless client devices in response to the indication of the anomalous event,
  - allocate space within the packet monitoring buffer to capture packet information for the connected wireless devices using the second set of weights.

2. The wireless access point of claim 1 wherein the packet monitoring buffer is organized as a ring buffer of one or more inner ring buffers, each connected wireless device is associated with a corresponding inner ring buffer.

3. The wireless access point of claim 2 wherein the at least one weight for each of the connected wireless devices is used to determine the size of the inner ring buffer associated with the associated wireless client device.

4. The wireless access point of claim 1 wherein the anomalous event of interest comprises a change to a number of connected wireless devices.

5. The wireless access point of claim 1 wherein the anomalous event of interest comprises a detected characteristic change associated with one of the connected wireless devices.

6. The wireless access point of claim 1 wherein the anomalous event of interest comprises a packet processing anomaly and determination of the second set of weights is based on an anomaly type.

7. The wireless access point of claim 1, the packet monitoring processor further to transmit captured packet information for a selected connected wireless client device to a data aggregator via a second interface.

8. The wireless access point of claim 1, the packet monitoring buffer management processor further to transmit captured packet information for a selected connected wireless client device to a data aggregator and to receive anomaly profile information from the data aggregator to generate the second set of weights.

9. A non-transitory computer-readable medium having stored thereon instructions that, when executed by one or more processors, are configurable to cause the one or more processors to:
- associate a first set of weights with wireless client devices connected via a first wireless interface with a wireless access point, wherein the first set of weights comprises at least one weight for each of the connected wireless client devices,
- allocate space within a packet monitoring buffer of the wireless access point to capture packet information for the connected wireless devices using the first set of weights,
- receive an indication of an anomalous event of interest,
- associate a second set of weights with the connected wireless client devices, wherein the second set of weights comprises at least one weight for each of the connected wireless client devices in response to the indication of the anomalous event,
- allocate space within the packet monitoring buffer to capture packet information for the connected wireless devices using the second set of weights.

10. The non-transitory computer-readable medium of claim 9 wherein the packet monitoring buffer is organized as a ring buffer of one or more inner ring buffers, each connected wireless device is associated with a corresponding inner ring buffer.

11. The non-transitory computer-readable medium of claim 10 wherein the at least one weight for each of the connected wireless devices is used to determine the size of the inner ring buffer associated with the associated wireless client device.

12. The non-transitory computer-readable medium of claim 9 wherein the anomalous event of interest comprises a change to a number of connected wireless devices.

13. The non-transitory computer-readable medium of claim 9 wherein the anomalous event of interest comprises a detected characteristic change associated with one of the connected wireless devices.

14. The non-transitory computer-readable medium of claim 9 wherein the anomalous event of interest comprises a packet processing anomaly and determination of the second set of weights is based on an anomaly type.

15. The non-transitory computer-readable medium of claim 9, the packet monitoring buffer management processor further to transmit captured packet information for a selected connected wireless client device to a data aggregator and to receive anomaly profile information from the data aggregator to generate the second set of weights.

16. A network device comprising:

a memory subsystem;

one or more hardware processors coupled with the memory subsystem, the one or more hardware processors configurable to associate a first set of weights with the connected wireless client devices, wherein the first set of weights comprises at least one weight for each of the connected wireless client devices, to allocate space within the packet monitoring buffer to capture packet information for the connected wireless devices using the first set of weights, to receive an indication of an anomalous event of interest, to associate a second set of weights with the connected wireless client devices, wherein the second set of weights comprises at least one weight for each of the connected wireless client devices in response to the indication of the anomalous event, and to allocate space within the packet monitoring buffer to capture packet information for the connected wireless devices using the second set of weights.

17. The network device of claim 16 wherein the packet monitoring buffer is organized as a ring buffer of one or more inner ring buffers, each connected wireless device is associated with a corresponding inner ring buffer.

18. The network device of claim 17 wherein the at least one weight for each of the connected wireless devices is used to determine the size of the inner ring buffer associated with the associated wireless client device.

19. The network device of claim 17 wherein the anomalous event of interest comprises a change to a number of connected wireless devices.

20. The network device of claim 17 wherein the anomalous event of interest comprises a detected characteristic change associated with one of the connected wireless devices.

* * * * *